G. W. Thorp,
Plow Share.

No. 110,693.                    Patented Jan. 3, 1871.

Witnesses:
E. Wolff
L. S. Mabee

Inventor:
Geo. W. Thorp
per Munn & Co.
Attorneys.

UNITED STATES PATENT OFFICE.

GEORGE W. THORP, OF COLUMBUS, KANSAS.

IMPROVEMENT IN EXTENSION-PLOWSHARES.

Specification forming part of Letters Patent No. 110,693, dated January 3, 1871.

*To all whom it may concern:*

Be it known that I, GEORGE W. THORP, of Columbus, in the county of Cherokee and State of Kansas, have invented a new and useful Improvement in Extension-Plowshares; and I do hereby declare that the following is a full, clear, and exact description thereof, which will enable others skilled in the art to make and use the same, reference being had to the accompanying drawings, forming part of this specification, in which—

Figure 1:
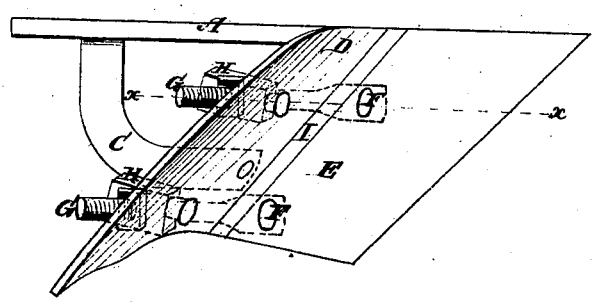
Figure 2:
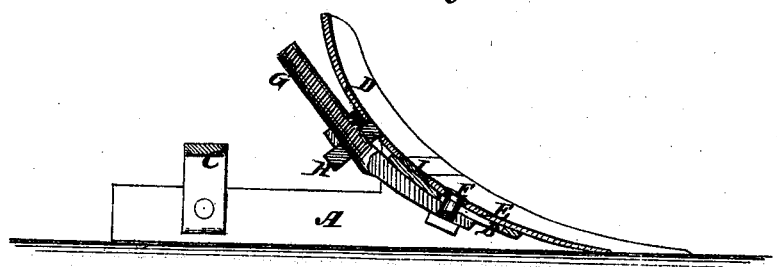

Figure 1 is a top view of a plow to which my improvement has been attached. Fig. 2 is a detail vertical section of the same, taken through the line $x$ $x$, Fig. 1.

Similar letters of reference indicate corresponding parts.

My invention has for its object to furnish an improved plow which shall be so constructed and arranged that the share may be extended as it becomes worn, and held securely in place when adjusted; and it consists in the construction and combination of the various parts, as hereinafter more fully described.

A represents the landside of the plow.

B is a plate, the forward edge of which is attached to or formed upon the forward part of the landside A, and the outer or rear end of which is supported by the brace-arm C, the outer end of which is secured to the outer part of the said plate B, and the inner end of which is secured to the rear part of the landside A.

D is the upper part or wing of the moldboard, which rests upon and is secured to the upper part of the plate B and the forward part of the landside A.

E is the movable or extension share, the upper part of which rests upon the forward part of the landside A and the lower part of the plate B. The share E is connected to the plate B by two bolts, F, which pass through slots in the plate B and through holes in the lower ends of the bars G, and have nuts screwed upon their ends, clamping the parts E B G securely to each other. The bars G have screw-threads cut upon their upper ends, which pass through lugs H, formed upon or attached to the rear side of the wing D, and have nuts screwed upon them above the said lugs H. By this construction, when the lower edge of the share E has been worn up to the point of the landside A, the nuts upon the bolts F and bars G are loosened and the share D slipped down a sufficient distance. A strip of metal, I, of suitable breadth, is then inserted upon the plate B, between the adjacent edges of the share E and wing D and the share drawn up closely to it by means of the nuts upon the bars G. The nuts upon the bolts F are then tightened, and the plow is again ready for use. When the share E again becomes worn up to the point of the landside, it may be again moved downward and the strip I replaced with a wider one, and so on until the share E is worn out. A set of four or more strips I is designed to be furnished with each plow.

Having thus described my invention, I claim as new and desire to secure by Letters Patent—

The share E, fast to adjustable bars G G, combined with a slotted plate, B, rigidly attached to an immovable brace, C, for the purpose of allowing the said share to be extended in the manner described.

GEORGE W. THORP.

Witnesses:
JOHN N. RITTER,
T. L. OLIPHANT.